US012755265B2

(12) United States Patent
Shahul Hamid et al.

(10) Patent No.: US 12,755,265 B2
(45) Date of Patent: Oct. 6, 2026

(54) SECURE PAYMENT TRANSACTIONS VIA GLOBAL NAVIGATION SATELLITE SYSTEM

(71) Applicant: International Business Machines Corporation, Armonk, NY (US)

(72) Inventors: Ahamed Jalaldeen Shahul Hamid, Bangalore (IN); Santosh Rajashekar, Bangalore (IN); Selvi John, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 18/813,189

(22) Filed: Aug. 23, 2024

(65) Prior Publication Data

US 2026/0057367 A1 Feb. 26, 2026

(51) Int. Cl.
*G06Q 20/32* (2012.01)

(52) U.S. Cl.
CPC .................................. *G06Q 20/325* (2013.01)

(58) Field of Classification Search
CPC .............................................. G06Q 20/00–425
See application file for complete search history.

(56) References Cited

U.S. PATENT DOCUMENTS 10,607,212 B2 3/2020 Sheets et al.
11,062,307 B2 7/2021 Rafferty et al.
11,182,766 B2 11/2021 Stickels et al.
2002/0123972 A1* 9/2002 Hodgson ................ G06Q 20/12 713/153
2008/0086417 A1* 4/2008 Bykov ................... G06Q 20/20 705/40
2009/0171846 A1 7/2009 Branca, Jr.
2013/0124319 A1 5/2013 Hodge et al.
2021/0125179 A1* 4/2021 Mach .................... G06F 18/217
(Continued)

FOREIGN PATENT DOCUMENTS

CN 102213764 A 10/2011
CN 104217323 A * 12/2014 ............. G06Q 20/36
(Continued)

OTHER PUBLICATIONS

Author unknown, "Emergency Payment Using a Digital Offline Wallet Powered by the Cloud and Blockchain," ip.com Prior Art Database, Mar. 5, 2022, 4 pages, ip.com, accessed Jul. 30, 2024, https://priorart.ip.com/IPCOM/000268858.
(Continued)

*Primary Examiner* — Mohammad A. Nilforoush
(74) *Attorney, Agent, or Firm* — Yee & Associates, P.C.

(57) ABSTRACT

Performing secure payment transactions via Global Navigation Satellite System (GNSS) is provided. An input is received from a payer corresponding to a GNSS user device to initiate a payment transaction in a payment message format from the payer to a payee via a GNSS protocol of a GNSS satellite to a payment system server corresponding to a payment service provider. The payment transaction is sent in a selected GNSS message format via a secure satellite communication link to the GNSS satellite to be transmitted to the payment system server corresponding to the payment service provider for processing of the payment transaction for the payee.

14 Claims, 4 Drawing Sheets

(56) References Cited

U.S. PATENT DOCUMENTS

| | | | |
|---|---|---|---|
| 2022/0147996 A1 | 5/2022 | Paranjpe et al. | |
| 2023/0226932 A1 | 7/2023 | Eggleston et al. | |

FOREIGN PATENT DOCUMENTS

| | | | |
|---|---|---|---|
| CN | 111988377 A | 11/2020 | |
| IN | 202141046784 A | 4/2023 | |
| WO | 2007041030 A3 | 11/2007 | |

OTHER PUBLICATIONS

Author unknown, "Out of sight," The Economist, Jul. 27, 2013, 6 pages, economist.com, accessed Aug. 16, 2024, https://www.economist.com/international/2013/07/27/out-of-sight.

Author unknown, "The evolution and future developments of GNSS tolling," Be Mobile News, Oct. 18, 2021, 7 pages, be-mobile.com, accessed Jul. 30, 2024, https://be-mobile.com/news/the-evolution-and-future-developments-of-gnss-tolling.

Author unknown, "Timing & Synchronisation," GNSS Asia, 2024, 3 pages, gnss.asia, accessed Jul. 30, 2024, https://gnss.asia/applications/timing-synchronization/.

Hensley, "Are satellites payments the future for improved financial inclusion?" Finextra Blog, Sep. 11, 2023, 6 pages, finextra.com, accessed Jul. 30, 2024, https://www.finextra.com/blogposting/24866/are-satellites-payments-the-future-for-improved-financial-inclusion.

Hoptroff, "GNSS vulnerabilities: securing the future of finance with new PNT solutions," Finance Derivative, 2024, 4 pages, financederivative.com, accessed Jul. 30, 2024, https://www.financederivative.com/gnss-vulnerabilities-securing-the-future-of-finance-with-new-pnt-solutions/.

Inside GNSS, "Financial Networks Shifting to GPS-Stamped Precise Time," Inside GNSS, Dec. 31, 2014, 15 pages, insidegnss.com, accessed Jul. 30, 2024, https://insidegnss.com/financial-networks-shifting-to-gps-stamped-precise-time/.

Manandhar, "Basic GNSS Introduction, Applications and Low-Cost Receiver System," Center for Spatial Information Science, Jan. 12, 2022, 52 pages, unoosa.org, accessed Jul. 30, 2024, https://www.unoosa.org/documents/pdf/icg/2022/Tokyo2022/07_Basic_GNSS_Introduction.pdf.

Manandhar, "GNSS Applications," Center for Spatial Information Science, 2024, 18 pages, unoosa.org, accessed Jul. 30, 2024, https://www.unoosa.org/documents/pdf/icg/2024/Tokyo2024/A30_GNSS_Applications_M01.pdf.

Rubio-Licht, "JPMorgan Adds to Space Ambitions with Off-Planet Payments," The Daily Upside, Jan. 11, 2024, 14 pages, thedailyupside.com, accessed Jul. 30, 2024, https://www.thedailyupside.com/finance/banking/jpmorgan-adds-to-space-ambitions-with-off-planet-payments/.

* cited by examiner

SECURE PAYMENT TRANSACTIONS VIA GLOBAL NAVIGATION SATELLITE SYSTEM

BACKGROUND

The disclosure relates generally to the Global Navigation Satellite System and more specifically to exchanging messages via the Global Navigation Satellite System.

The Global Navigation Satellite System (GNSS) is a group of satellites strategically placed to generate and relay messages containing information, such as, for example, positioning data, timing data, navigation data, and the like, from space to connected sensors on the earth, typically embedded in mobile devices, such as, for example, smart phones, vehicles, boats, airplanes, and the like. A GNSS device can receive messages from one or more GNSS satellites in all types of weather conditions, anywhere on or near the Earth's surface. GNSS devices are commonly used in various applications, such as, for example, navigation, mapping, timing, tracking, and the like.

SUMMARY

According to one illustrative embodiment, a method is provided. An input is received from a payer corresponding to a global navigation satellite system (GNSS) user device to initiate a payment transaction in a payment message format from the payer to a payee via a GNSS protocol of a GNSS satellite to a payment system server corresponding to a payment service provider. The payment transaction is sent in a selected GNSS message format via a secure satellite communication link to the GNSS satellite to be transmitted to the payment system server corresponding to the payment service provider for processing of the payment transaction for the payee. According to other illustrative embodiments, a computer system and computer program product are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
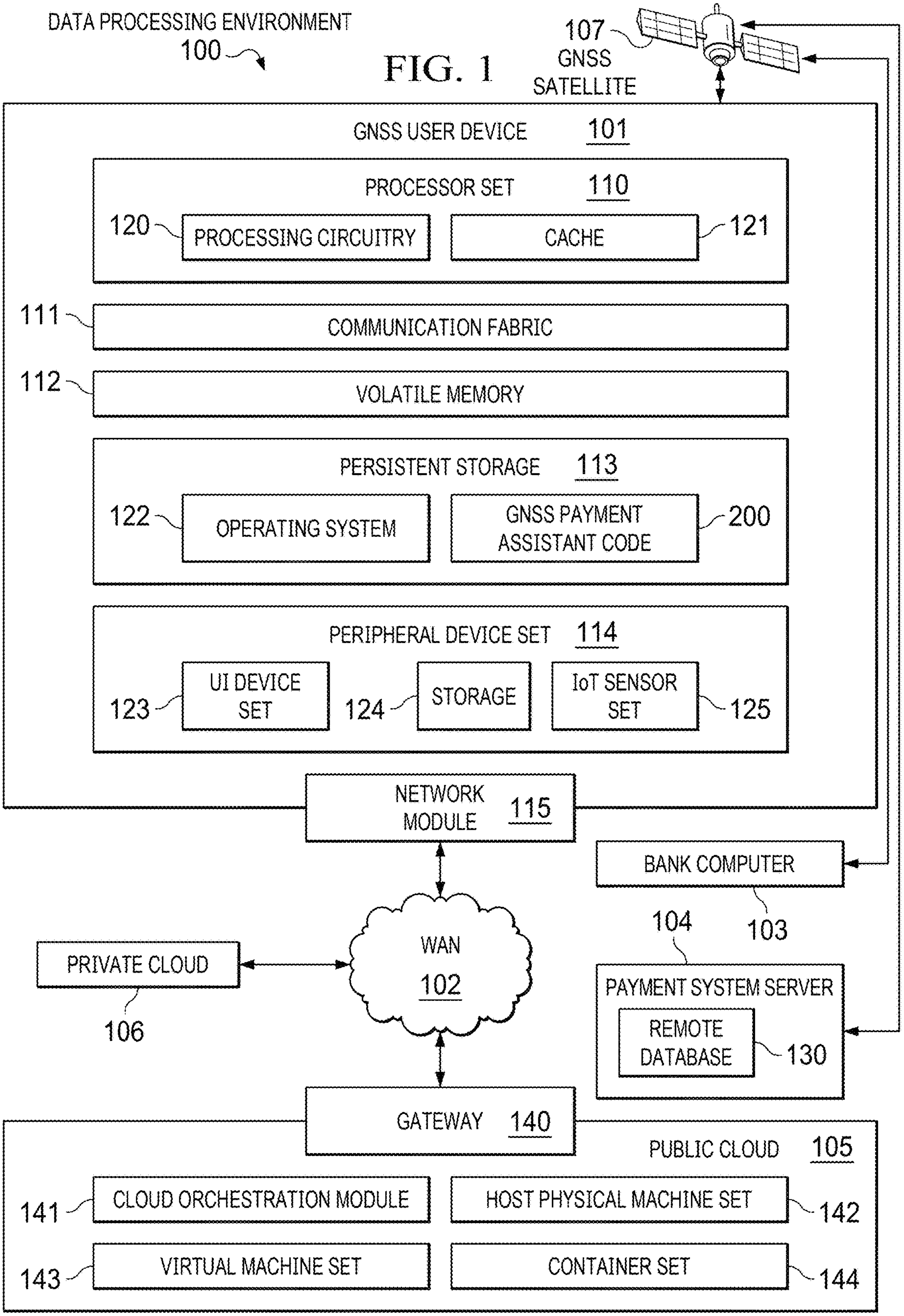
FIG. 1 is a pictorial representation of a computing environment in which illustrative embodiments may be implemented.
Figure 2:
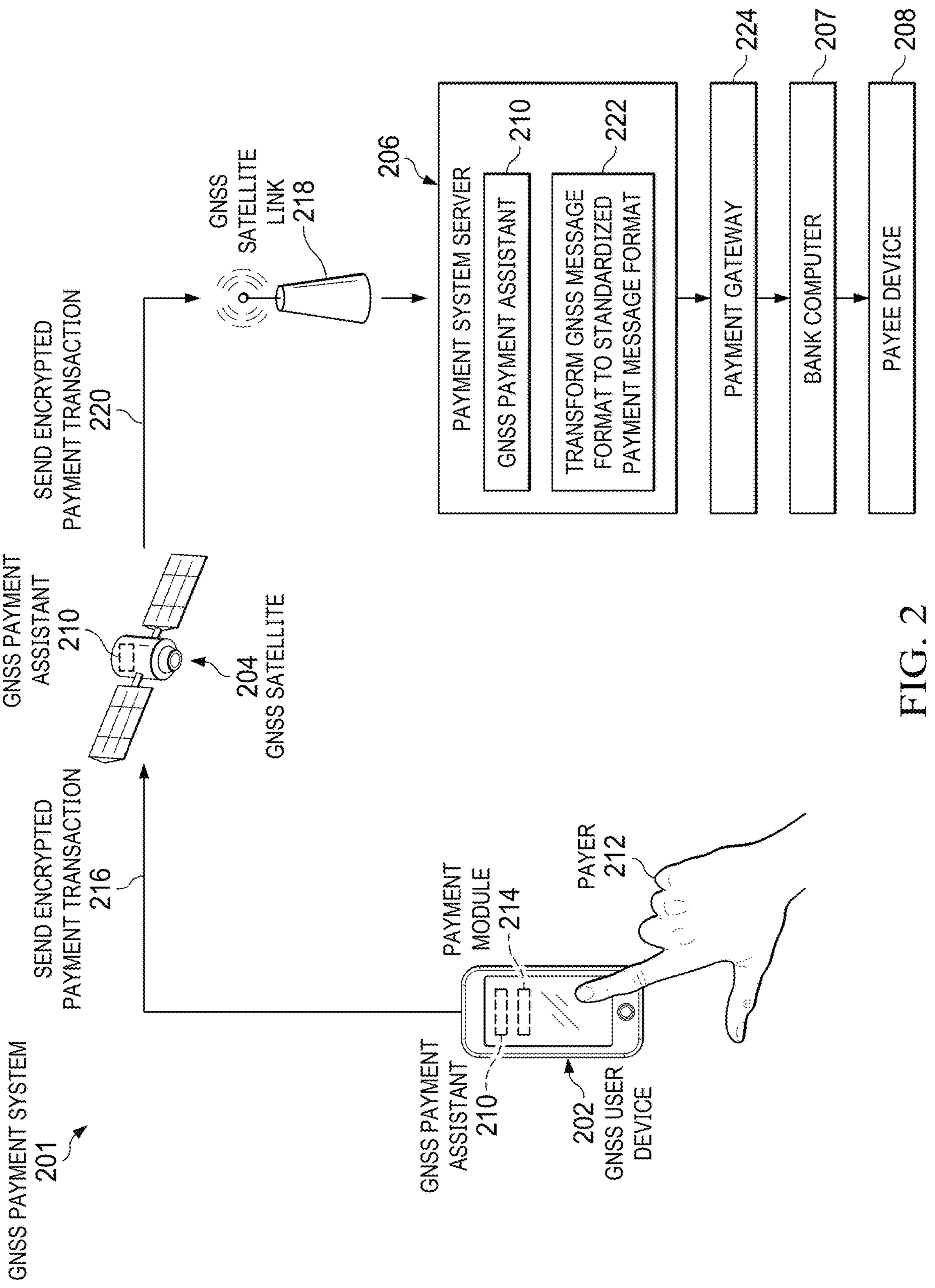
FIG. 2 is a diagram illustrating an example of a GNSS payment system in accordance with an illustrative embodiment.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 shows a pictorial representation of a data processing environment in which illustrative embodiments may be implemented. Data processing environment 100 contains an example of an environment for the execution of at least some of the code involved in performing the inventive methods of illustrative embodiments, such as global navigation satellite system (GNSS) payment assistant code 200.

For example, GNSS payment assistant code 200 utilizes generative artificial intelligence and robotic processing automation to enable users (i.e., payers) to make secure payment transactions to payees via the bidirectional communication capabilities of the GNSS. GNSS payment assistant code 200 enables payers to continue performing payment transactions regardless of geographic location (e.g., while moving), even if the payers are in remote locations without Internet connectivity or in locations during severe weather events, such as heavy rainstorms. By GNSS payment assistant code 200 utilizing the GNSS and GNSS user devices equipped with a payment module of illustrative embodiments, GNSS payment assistant code 200 eliminates the need for payers to use satellite phones or satellite broadband devices to perform payment transactions via satellite and, therefore, allow payers to avoid the expensive upfront costs corresponding to purchasing satellite phones or satellite broadband devices and the regularly recurring service fees.

In addition, GNSS payment assistant code 200 avoids security threats, such as, for example, Man-in-the-Middle attacks, eavesdropping attacks, and the like, to payment transactions occurring in a typical Internet communication that travel via numerous hops between payer and payment system servers to payee devices. Further, GNSS payment assistant code 200 supports both domestic and international payment transactions using various payment options, such as, for example, digital wallet, credit card, debit card, bank account, quick response (QR) code, and the like, from payers to payees based on the payment transaction type and current geographic location of both the payer and payee.

In addition to GNSS payment assistant code 200, data processing environment 100 includes, for example, GNSS user device 101, wide area network (WAN) 102, bank computer 103, payment system server 104, public cloud 105, private cloud 106, and GNSS satellite 107. In this embodiment, GNSS user device 101 includes processor set 110 (including processing circuitry 120 and cache 121), communication fabric 111, volatile memory 112, persistent storage 113 (including operating system 122 and GNSS payment assistant code 200, as identified above), peripheral device set 114 (including user interface (UI) device set 123, storage 124, and Internet of Things (IoT) sensor set 125), and network module 115. Payment system server 104 includes remote database 130. Public cloud 105 includes gateway 140, cloud orchestration module 141, host physical machine set 142, virtual machine set 143, and container set 144.

GNSS user device 101 may take the form of a smart phone, laptop computer, tablet computer, smart watch, smart glasses, virtual reality device, or any other wearable or portable device, such as a vehicle navigation system, now known or to be developed in the future that is capable of, for example, running a program, accessing a network, and querying a database, such as remote database 130. A payer utilizes GNSS user device 101 to accomplish a secure payment transaction between GNSS user device 101 and bank computer 103 via GNSS satellite 107. GNSS satellite 107 represents a plurality of satellites in the GNSS.

Processor set 110 includes one or more processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

Program instructions are typically loaded onto GNSS user device 101 to cause a series of operational steps to be performed by processor set 110 of GNSS user device 101 and thereby effect a method, such that the program instructions thus executed will instantiate the methods specified in flowcharts and/or narrative descriptions of methods included in this document (collectively referred to as "the inventive methods"). These program instructions are stored in various types of storage media, such as cache 121 and the other storage media discussed below. The program instructions, and associated data, are accessed by processor set 110 to control and direct performance of the inventive methods. In data processing environment 100, at least some of the instructions for performing the inventive methods of illustrative embodiments may be stored in GNSS payment assistant code 200 in persistent storage 113.

Communication fabric 111 is the signal conduction path that allows the various components of GNSS user device 101 to communicate with each other. Typically, this fabric is made of switches and electrically conductive paths, such as the switches and electrically conductive paths that make up buses, bridges, physical input/output ports, and the like. Other types of signal communication paths may be used, such as wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In GNSS user device 101, the volatile memory 112 is located in a single package and is internal to GNSS user device 101.

Persistent storage 113 is any form of non-volatile storage that is now known or to be developed in the future. The non-volatility of this storage means that the stored data is maintained regardless of whether power is being supplied to GNSS user device 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of GNSS user device 101. Data communication connections between the peripheral devices and the other components of GNSS user device 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the Internet. In various embodiments, UI device set 123 may include components such as a display screen, speaker, microphone, wearable devices (such as smart glasses and smart watches), keyboard, mouse, touchpad, and haptic devices. Storage 124 is external storage, such as an external hard drive, or insertable storage, such as an SD card. Storage 124 may be persistent and/or volatile. IoT sensor set 125 is made up of sensors that can be used in Internet of Things applications. For example, one sensor may be a thermometer, and another sensor may be a motion detector.

Network module 115 is the collection of software, hardware, and firmware that allows GNSS user device 101 to communicate with other devices, such as GNSS satellite 107, payment system server 104, and the like. Network module 115 may include hardware, such as Wi-Fi signal transceivers, software for packetizing and/or de-packetizing data for communication network transmission, and/or web browser software for communicating data over the Internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Program instructions for performing the inventive methods can typically be downloaded to GNSS user device 101 from a computer or external storage device via WAN 102 using a network adapter card or network interface included in network module 115.

WAN 102 is any wide area network (e.g., the Internet) capable of communicating data over non-local distances by any technology for communicating data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

Bank computer 103 is any computer system that is used and controlled by an entity, such as, for example, a bank, financial institution, or the like, which corresponds to payee's account (e.g., payee's bank account). For example, in a hypothetical case where GNSS user device 101 is designed to provide a payment transaction to a payee, this payment transaction would typically be communicated from network module 115 of GNSS user device 101 via GNSS satellite 107 to payee's bank account corresponding to bank computer 103. Then, the payee utilizes a client device to connect to bank computer 103 to access payee's bank account information to confirm that the payment transaction has been completed. The client device corresponding to the payee can be, for example, a desktop computer, laptop computer, tablet computer, smart phone, mainframe computer, or the like. In addition, bank computer 103 can represent a plurality of different bank computers corresponding to a plurality of different banking entities.

Payment system server 104 is any computer system that serves at least some data and/or functionality to bank computer 103 and GNSS user device 101. Payment system server 104 is controlled and used by a payment service provider. Payment system server 104 represents the machine(s) that collect and store helpful and useful data for use by other devices and computers, such as GNSS user device 101. For example, in a hypothetical case where GNSS user device 101 of illustrative embodiments utilizing GNSS payment assistant code 200 is designed and programmed to generate a real time payment transaction execution success prediction based on historical data, then this historical data may be provided to GNSS payment assistant code 200 in GNSS user device 101 from remote database 130 of payment system server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In today's fast-paced world, the need for seamless, secure, reliable, and convenient payment solutions continue to increase. Existing electronic payment solutions require reliable, high-speed Internet connectivity for payers to perform electronic payment transactions. Due to security concerns, offline payment solutions, such as embedded digital wallets and QR code stickers, have limitations for electronic payment transactions.

Further, while traveling, a payer may not be able to obtain reliable, high-speed Internet connectivity or be in a geographic location that does not have Internet connectivity. Furthermore, broadband and mobile data-based Internet connectivity can be impacted during network outages caused by service disruption, natural disaster, or any other major event that lasts for an extended period of time.

Even though payers can use satellite Internet during network outages, satellite phones and satellite broadband devices are not feasible options for most payers. For example, purchasing satellite phones and satellite broadband devices has high upfront costs, along with recurring subscription fees for satellite communication plans with satellite Internet connectivity. In addition, malfunctioning or damages to satellite phones and satellite broadband devices will require the payers to pay for expensive repairs or replacement costs. Also, satellite Internet communication can be impacted during heavy rainstorms and other severe meteorological events. Moreover, geo-specific regulations, security restrictions, and the like can make buying or carrying satellite phones and satellite broadband devices in certain geographic regions difficult for payers. In addition, satellite Internet communication established via satellite dish antenna limits the mobility and reachability of payers. Further, satellite Internet communication established via satellite dish antenna can experience outages due to natural disasters, for example. Due to these issues with satellite phones and satellite broadband devices, a new solution is needed to enable payers to perform electronic payment transactions securely regardless of physical geographic location and without dependency on Internet connectivity.

Illustrative embodiments enable secure payment transactions via the global navigation satellite system (GNSS). GNSS is an arrangement of satellites in space that transmit positioning and timing data to GNSS receivers on earth. Unlike the unidirectional communication links of conventional global positioning system technology, GNSS technology supports bidirectional communication between satellites and GNSS user devices. The extensibility of message formats used in the GNSS allows illustrative embodiments to add new message types and commands.

Illustrative embodiments incorporate a GNSS payment assistant, which is a generative artificial intelligence-based digital assistant, within GNSS user devices, GNSS satellites, and payment system servers corresponding to payment service providers. Illustrative embodiments utilize the GNSS payment assistant in the GNSS user devices to: 1) prioritize payment transactions based on various factors, such as payment type, current time of a payment transaction versus next batch execution time for batch payment transactions, real time prediction of successful instant payment execution probability based on historic payment transaction data corresponding to respective payment service providers, current geographic location, and the like; 2) select the most suitable GNSS message format from a set of GNSS message formats for the type of payment of each respective payment transaction; 3) encrypt payment transactions in a standardized payment message format with a public encryption key provided by that particular payment service provider using hardware-based encryption (e.g., using a hardware security module located in a GNSS user device); 4) transform encrypted payment transactions to a selected GNSS message format; 5) send the encrypted payment transactions in the selected GNSS message format to a GNSS satellite; 6) receive encrypted payment status messages (e.g., payment success or payment failure) in the selected GNSS message format from the GNSS satellite; 7) transform the encrypted payment status messages in the selected GNSS message format back to the standardized payment message format; 8) decrypt the encrypted payment status messages using hardware-based decryption with a public encryption key corresponding to that particular payment service provider; and 9) output the decrypted payment status messages in the standardized payment message format to the payers via a display of the GNSS user devices.

Illustrative embodiments utilize the GNSS payment assistant in the GNSS satellite to: 1) dynamically select a target ground station of a designated payment service provider based on various factors, such as real time success rate of payment transactions, lowest payment transaction processing charges, and the like; and 2) route the encrypted payment transactions to the selected target ground station of a designated payment service provider.

Illustrative embodiments utilize the GNSS payment assistant in the payment system servers of the payment service providers to: 1) transform the payment transactions received in the selected GNSS message format to the standardized payment message format needed by the payment system server of that particular payment service provider; and 2) decrypt the encrypted payment transactions in the standardized payment message format with the private encryption key corresponding to that particular payment service provider using hardware-based decryption.

Thus, illustrative embodiments enable payers to utilize the bidirectional communication capabilities of the GNSS to initiate secure payment transactions from the payers' GNSS user devices via a GNSS satellite regardless of the payers' physical geographic location and without dependency on Internet connectivity. Illustrative embodiments add a payment module to the GNSS user devices either as an embedded hardware device or a software plug-in to securely utilize one of a plurality of personalized payment options, such as, for example, a digital wallet, credit card, debit card, bank account, QR code, and the like, which is appropriate to perform a payment transaction from the current geographic location of the payer identified by the payer's GNSS user device and the geographic location of the designated payment service provider.

Illustrative embodiments utilize the existing set of transmission protocols of the bidirectional data communication links for the GNSS message format and the standardized payment message format, which corresponds to the new message types and commands, to perform the secure payment transactions. Illustrative embodiments also implement robotic process automation to accelerate the payment transactions performed by payers via the GNSS user devices. In addition, illustrative embodiments utilize the bidirectional data communication links of the GNSS or other types of satellite links in the ground stations of the payment service providers to receive the payment transactions, process the payment transactions, and send the payments to the appropriate bank computers corresponding to payees via a payment gateway. Illustrative embodiments protect the payment transactions transmitted by the GNSS user device to the GNSS satellite and from the GNSS satellite to the designated payment service provider by utilizing hardware-based encryption (e.g., hardware security modules) at the network level, the message level, or a combination of both the network level and the message level based on the specific public encryption key corresponding to the designated payment service provider.

As a result, illustrative embodiments enable payers to perform secure payment transactions regardless of their geographic location, even if the payers are in remote locations that do not have Internet connectivity or in locations during severe weather conditions, such as heavy rainstorms. In addition, illustrative embodiments allow payers to continue performing electronic payment transactions during Internet outages of their broadband and mobile data services caused by service disruptions, natural disaster, or any major event that lasts for an extended period. Illustrative embodiments utilize the bidirectional communication capabilities of the GNSS and GNSS user devices to eliminate the need for satellite phones and satellite broadband devices to perform payment transactions via satellite. Also, illustrative embodiments avoid potential security threats, such as, for example, Man-in-the-Middle attacks, eavesdropping attacks, and the like, to payment transactions that can occur in typical Internet communications while being transmitted via numerous hops between payer and payment systems. Further, illustrative embodiments support domestic and international electronic payment transactions using the various payment methods, such as, for example, digital wallet, credit card, debit card, bank account, QR Code, and the like.

Thus, illustrative embodiments provide one or more technical solutions that overcome a technical problem with an inability of current solutions to utilize the bidirectional communication capabilities of the GNSS to perform secure payment transactions from any geographic location without reliance on Internet connectivity. As a result, these one or more technical solutions provide a technical effect and practical application in the field of the GNSS.

With reference now to FIG. 2, a diagram illustrating an example of a GNSS payment system is depicted in accordance with an illustrative embodiment. GNSS payment system 201 may be implemented in a data processing environment, such as data processing environment 100 in FIG. 1. GNSS payment system 201 is a system of hardware and software components for performing secure payment transactions using the bidirectional communication capabilities of the GNSS.

In this example, GNSS payment system 201 includes GNSS user device 202, GNSS satellite 204, payment system server 206, bank computer 207, and payee device 208. GNSS user device 202, GNSS satellite 204, payment system server 206, and bank computer 207 can be, for example, GNSS user device 101, GNSS satellite 107, payment system server 104, and bank computer 103 in FIG. 1. However, it should be noted that GNSS payment system 201 is intended as an example only and not as a limitation on illustrative embodiments. For example, GNSS payment system 201 can include any number of GNSS user devices, GNSS satellites, payment system servers, bank computers, payee devices, and other devices and components not shown.

GNSS payment assistant 210 is a distributed, generative artificial intelligence-based digital assistant that includes robotic processing automation. GNSS payment assistant 210 is located in GNSS user device 202, GNSS satellite 204, and payment system server 206. GNSS payment assistant 210 is implemented by GNSS payment assistant code 200 in FIG. 1. Each of GNSS user device 202, GNSS satellite 204, and payment system server 206 is a GNSS transceiver capable of sending and receiving GNSS messages.

In this example, GNSS user device 202 is shown as a portable handheld device, such as a smart phone, utilized by payer 212 to perform payment transactions. However, it should be noted that GNSS user device 202 can be other types of devices, such as, for example, tablet computers, laptop computers, virtual reality devices, or the like. Moreover, GNSS user device 202 can be located in a vehicle as an in-dash device, such as an onboard navigation system, usable by payer 212.

GNSS user device 202 also includes payment module 214. It should be noted that current GNSS user devices do not support and, therefore, cannot perform payment transactions. GNSS user device 202 utilizes payment module 214 of illustrative embodiments to support and, therefore, perform payment transactions. Payment module 214 can be either a hardware device embedded in GNSS user device 202, or a software component downloaded on GNSS user device 202. Further, payment module 214 supports multiple payment options to perform a particular payment transaction. The payment options can include, for example, digital wallet, credit card, debit card, bank account, and QR code. In addition, payment module 214 contains a list of a set of payment service providers approved by payer 212 to process payment transactions. For example, payment module 214 can designate a particular payment service provider from the list to process a payment transaction by specifying that particular payment service provider in the payment transaction (e.g., in the header of the payment transaction). Also, payment module 214 can include other information, such as, for example, virtual payment addresses and the like, corresponding to payer 212 and payee device 208 with appropriate security controls.

GNSS user device 202 utilizes GNSS payment assistant 210 to perform various functions automatically via robotic processing automation. For example, GNSS user device 202 utilizes GNSS payment assistant 210 to prioritize electronic payment transactions based on various factors, such as payment type, current time of an electronic payment transaction versus next batch execution time for a batch of electronic payment transactions, real time prediction of successful instant payment execution probability based on historic payment transaction processing data corresponding to respective payment service providers or their specific geographic location. GNSS user device 202 also utilizes GNSS payment assistant 210 to select the most suitable GNSS message format for each respective electronic payment transaction based on the type of payment corresponding to a particular payment transaction. GNSS user device 202 also utilizes GNSS payment assistant 210 to encrypt each electronic payment transaction in a standardized payment message format with a public encryption key provided by the payment service provider corresponding to payment system server 206 using hardware-based encryption. For example, GNSS payment assistant 210 in GNSS user device 202 encrypts the electronic payment transaction at the field level with the public encryption key provided by the payment service provider using the hardware-based encryption.

In addition, GNSS user device 202 utilizes GNSS payment assistant 210 to transform the encrypted payment transaction in the standardized payment message format to a selected GNSS message format. GNSS payment assistant 210 in GNSS user device 202 can utilize, for example, a foundation model, data transformation map, custom mapping component, or similar technique to transform payment transactions in the standardized payment message format to the selected GNSS message format and vice versa. The selected GNSS message format can be, for example, a National Marine Electronics Association (NMEA) 0183 message format, which is a combined electrical and data specification for communication. The NMEA 0183 standard uses an American Standard Code for Information Interchange (ASCII), serial communications protocol that defines how data are transmitted in a "sentence." ASCII is a character encoding standard for electronic communication. ASCII codes represent text in computers, telecommunications equipment, and other devices. For example, GNSS payment assistant 210 in GNSS user device 202 can transmit payment transactions in an ASCII character encoding format or in a binary format.

Afterward, at 216, GNSS payment assistant 210 in GNSS user device 202 sends the encrypted payment transaction in the selected GNSS message format to GNSS satellite 204. It should be noted that if the encrypted payment transaction fits within a single GNSS message, then GNSS payment assistant 210 in GNSS user device 202 sends the encrypted payment transaction in the selected GNSS message format as is to GNSS satellite 204. However, if the encrypted payment transaction exceeds the size of a single GNSS message, then GNSS payment assistant 210 in GNSS user device 202 divides the encrypted payment transaction into multiple GNSS messages. For example, the first GNSS message containing a first part of payment transaction will include a message count for the entire encrypted payment transaction, followed by remaining GNSS messages containing the rest of the encrypted payment transaction.

Subsequently, GNSS user device 202 utilizes GNSS payment assistant 210 to receive an encrypted payment status notification (e.g., electronic payment transaction success, electronic payment transaction failure, electronic payment transaction error, or the like) in the selected GNSS message format from payment system server 206 through GNSS satellite 204. GNSS user device 202 utilizes GNSS payment assistant 210 to transform the encrypted payment status message received in the GNSS message format to the standardized payment message format. Then, GNSS user device 202 utilizes GNSS payment assistant 210 to decrypt the encrypted payment status message with a public encryption key corresponding to the designated payment service provider using, for example, hardware-based decryption of a hardware security module located in GNSS user device 202.

GNSS satellite 204 utilizes GNSS payment assistant 210 to receive the encrypted payment transaction sent by GNSS user device 202 through GNSS satellite 204 and select a target ground station (i.e., GNSS satellite link 218) corresponding to payment system server 206 based on various factors, such as, for example, real time execution success rate of payment transactions, lowest payment processing charges, and the like, associated with the geographic location of GNSS satellite link 218. Afterward, at 220, GNSS payment assistant 210 in GNSS satellite 204 sends the encrypted payment transaction to GNSS satellite link 218 corresponding to payment system server 206. It should be noted that payment system server 206 can use an alternative to the GNSS, such as, for example, a satellite earth station, satellite dish antenna, satellite broadband devices, satellite phone, or the like in one or more locations where reliable satellite Internet communication can be established to receive payment transactions from GNSS satellite 204.

GNSS payment assistant 210 utilizes the bidirectional communication capabilities of the GNSS to send payment transactions from GNSS user device 202 to GNSS satellite 204 and from GNSS satellite 204 to payment system server 206. For example, because of conformance with GNSS protocols and message formats, both GNSS user device 202 and GNSS satellite 204 are able to transmit the payment transactions. GNSS payment assistant 210 also utilizes robotic process automation to accelerate the payment transaction processing.

At 222, payment system server 206 utilizes GNSS payment assistant 210 to receive the encrypted payment transaction and transform the encrypted payment transaction received in the selected GNSS message format into the standardized payment message format needed by payment system server 206 to process the payment transaction. GNSS payment assistant 210 in payment system server 206 transforms the encrypted payment transaction from the selected GNSS message format (e.g., the NMEA 0183 message format) into the specific standardized payment message format needed by payment system server 206 using, for example, a foundation model, data transformation map, custom mapping component, or similar technique. In addition, payment system server 206 utilizes GNSS payment assistant 210 to decrypt the encrypted payment transaction in the standardized payment message format with the private encryption key corresponding to payment system server 206 using hardware-based decryption. It should be noted that the encrypted payment transaction can only be decrypted using the private encryption key of the designated payment service provider, which is identified in the header of the payment transaction, in order for payment system server 206 to process the payment transaction.

Moreover, payment system server 206 also utilizes GNSS payment assistant 210 to perform, for example, data validation, payment deception check, regulatory compliance, and the like, on the payment transaction. In response to the payment transaction passing the data validation, payment deception check, and regulatory compliance, GNSS payment assistant 210 in payment system server 206 sends the payment transaction to payment gateway 224. Payment gateway 224 then sends the payment transaction to bank computer 207, which corresponds to the bank account of the payee. Payee device 208 can be notified of the payment transaction and used by the payee to verify the payment transaction. Payee device 208 is owned by the payee or payee organization. For example, the payee can be an individual, merchant, business, company, corporation, institution, or the like. Furthermore, GNSS payment assistant 210 in payment system server 206 generates and sends an acknowledgement of execution of the payment transaction to GNSS user device 202 of payer 212 using GNSS satellite link 218 to GNSS payment assistant 210 in GNSS user device 202 via GNSS satellite 204.

It should be noted that each GNSS payment assistant 210 includes a foundation model. The foundation model is pre-trained on financial services data corresponding to a plurality of different payment service providers. GNSS payment assistant 210 enforces artificial intelligence governance compliance by continuing to utilize updated training data from authentic sources to fine-tune the foundation model.

The foundation model of GNSS payment assistant 210 in GNSS user device 202 is fine-tuned to prioritize the payment transactions based on payment type, current payment transaction time versus batch execution time for batch payment transactions, real time prediction of instant payment execution success probability, and the like, using training data of sample payment messages and instant payment execution statistics. Further, the foundation model of GNSS payment assistant 210 in GNSS user device 202 is fine-tuned to select the most suitable GNSS message format based on payment type using a combination of sample GNSS message formats and equivalent standardized payment message formats corresponding to payment types supported by particular GNSS message formats. Furthermore, the foundation model of GNSS payment assistant 210 in GNSS user device 202 is fine-tuned to transform a payment transaction in a particular standardized payment message format to a selected GNSS message format using sample standardized payment messages in their original format and equivalent GNSS message representations of that particular standardized payment message.

The foundation model of GNSS payment assistant 210 in GNSS satellite 216 is fine-tuned to automatically select a target ground station of the designated payment service provider based on real time execution success rate of payment transactions of the designated payment service provider, lowest payment processing charges, and the like, using historical transaction execution statistics and payment processing charges of respective payment service providers.

The foundation model of GNSS payment assistant 210 in payment system server 206 is fine-tuned to transform the payment transaction received in the selected GNSS message format to the standardized payment message format needed by payment system server 206 by utilizing sample GNSS message formats and equivalent standardized payment message formats. However, it should be noted that GNSS payment assistant 210 located in GNSS user device 202, GNSS satellite 204, and payment system server 206 may utilize the same foundation model or different foundation models depending on the processes or tasks performed by each of GNSS user device 202, GNSS satellite 204, and payment system server 206.

Figure 3A:
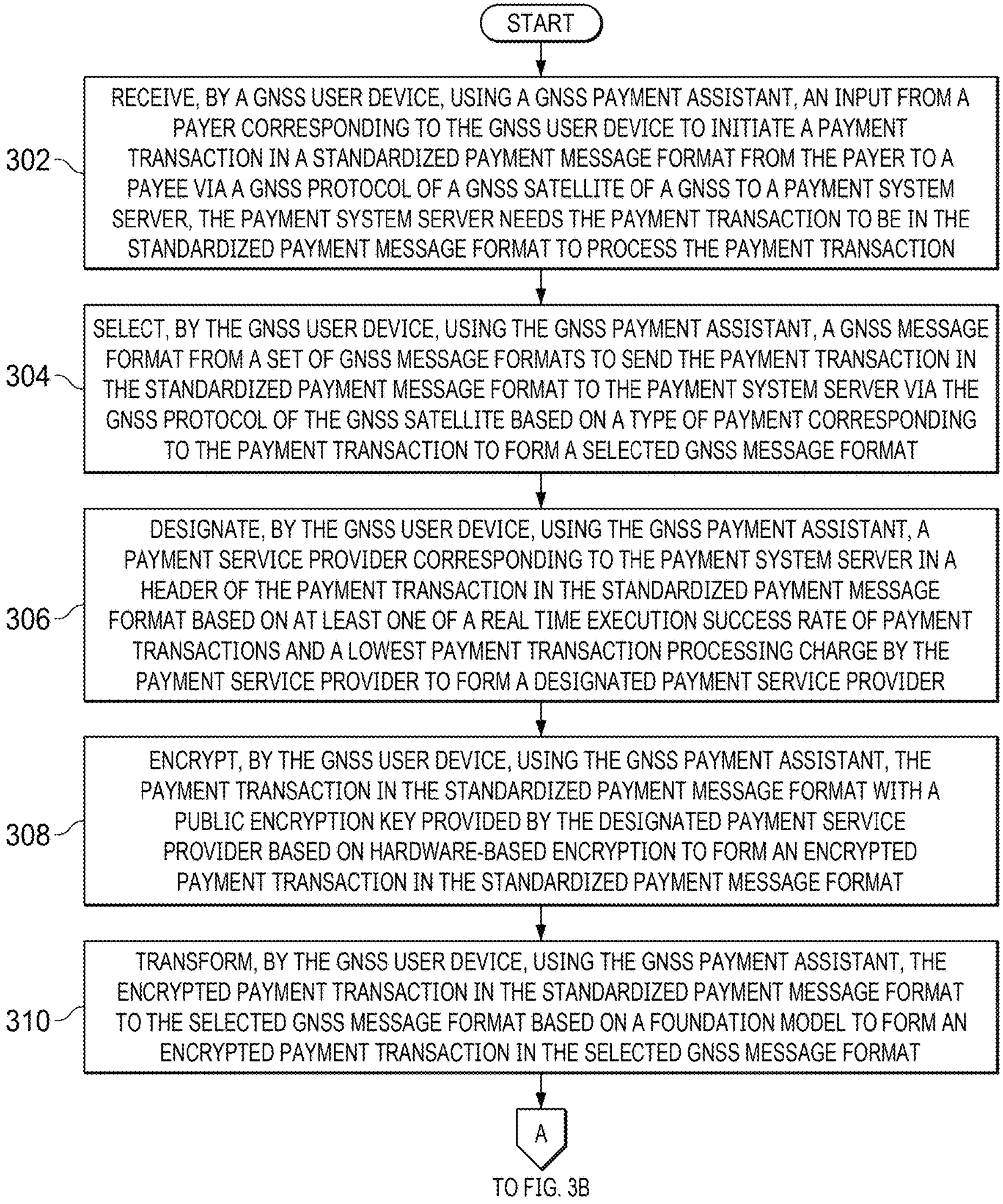
FIGS. 3A-3B are a flowchart illustrating a process for performing secure payment transactions via GNSS in accordance with an illustrative embodiment.
Figure 3B:
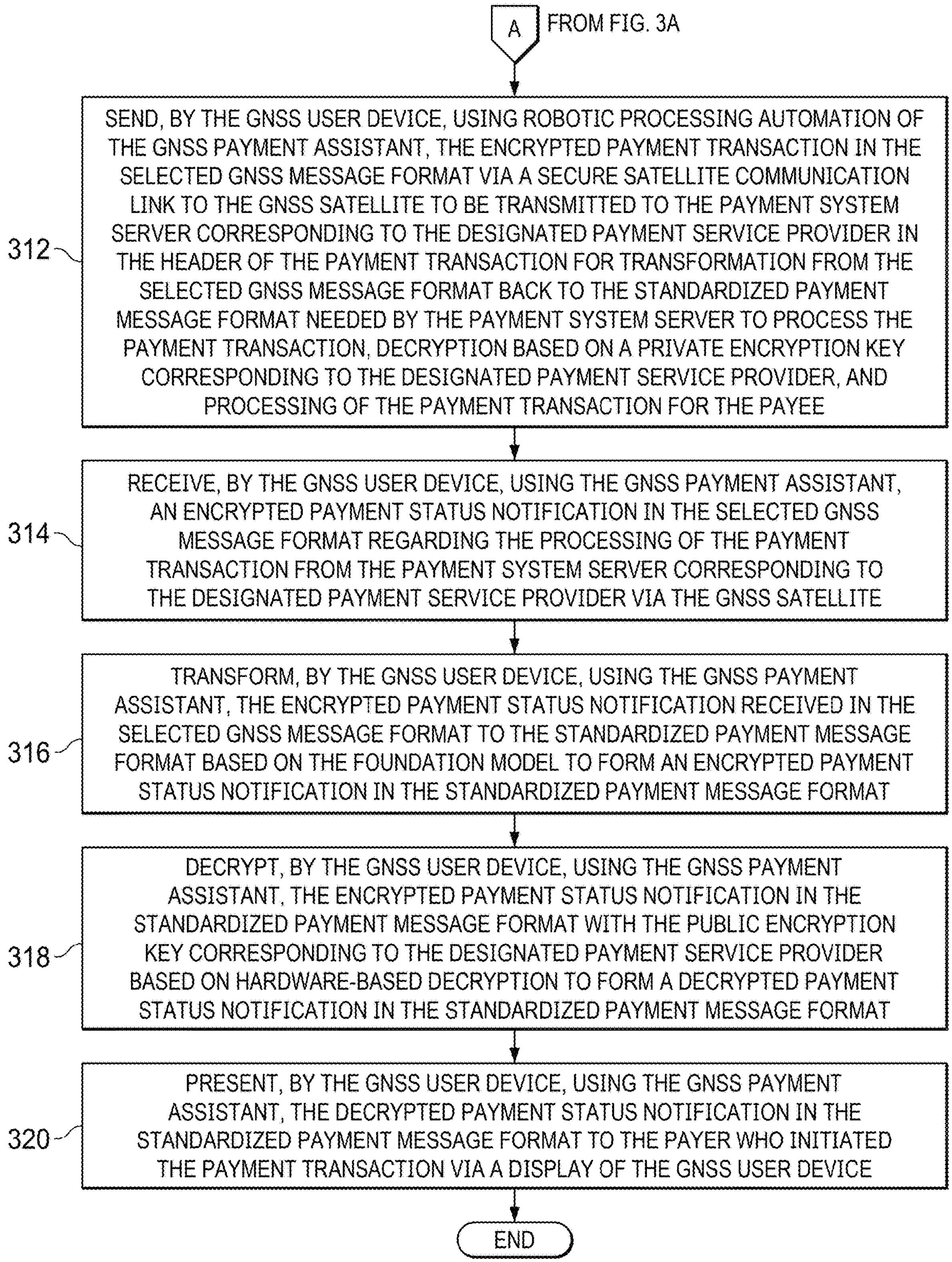

With reference now to FIGS. 3A-3B, a flowchart illustrating a process for performing secure payment transactions via GNSS is shown in accordance with an illustrative embodiment. The process shown in FIGS. 3A-3B may be implemented in a GNSS user device, such as, for example, GNSS user device 101 in FIG. 1 or GNSS user device 202 in FIG. 2. For example, the process shown in FIGS. 3A-3B may be implemented by GNSS payment assistant code 200 in FIG. 1.

The process begins when the GNSS user device, using a GNSS payment assistant, receives an input from a payer corresponding to the GNSS user device to initiate a payment transaction in a standardized payment message format from the payer to a payee via a GNSS protocol of a GNSS satellite of a GNSS to a payment system server (step 302). The payment system server needs the payment transaction to be in the standardized payment message format to process the payment transaction.

In response to receiving the input to initiate the payment transaction, the GNSS user device, using the GNSS payment assistant, selects a GNSS message format from a set of GNSS message formats to send the payment transaction in the standardized payment message format to the payment system server via the GNSS protocol of the GNSS satellite based on a type of payment corresponding to the payment transaction to form a selected GNSS message format (step 304). In addition, the GNSS user device, using the GNSS payment assistant, designates a payment service provider corresponding to the payment system server in a header of the payment transaction in the standardized payment message format based on at least one of a real time execution success rate of payment transactions and a lowest payment transaction processing charge by the payment service provider to form a designated payment service provider (step 306).

Further, the GNSS user device, using the GNSS payment assistant, encrypts the payment transaction in the standardized payment message format with a public encryption key provided by the designated payment service provider based on hardware-based encryption to form an encrypted payment transaction in the standardized payment message format (step 308). Furthermore, the GNSS user device, using the GNSS payment assistant, transforms the encrypted payment transaction in the standardized payment message format to the selected GNSS message format based on a foundation model to form an encrypted payment transaction in the selected GNSS message format (step 310).

Afterward, the GNSS user device, using robotic processing automation of the GNSS payment assistant, sends the encrypted payment transaction in the selected GNSS message format via a secure satellite communication link to the GNSS satellite to be transmitted to the payment system server corresponding to the designated payment service provider in the header of the payment transaction for transformation from the selected GNSS message format back to the standardized payment message format needed by the payment system server to process the payment transaction, decryption based on a private encryption key corresponding to the designated payment service provider, and processing of the payment transaction for the payee (step 312). Subsequently, the GNSS user device, using the GNSS payment assistant, receives an encrypted payment status notification in the selected GNSS message format regarding the processing of the payment transaction from the payment system server corresponding to the designated payment service provider via the GNSS satellite (step 314).

The GNSS user device, using the GNSS payment assistant, transforms the encrypted payment status notification received in the selected GNSS message format to the standardized payment message format based on the foundation model to form an encrypted payment status notification in the standardized payment message format (step 316). Moreover, the GNSS user device, using the GNSS payment assistant, decrypts the encrypted payment status notification in the standardized payment message format with the public encryption key corresponding to the designated payment service provider based on hardware-based decryption to form a decrypted payment status notification in the standardized payment message format (step 318). The GNSS user device, using the GNSS payment assistant, then presents the decrypted payment status notification in the standardized payment message format to the payer who initiated the payment transaction via a display of the GNSS user device (step 320). Thereafter, the process terminates.

Thus, illustrative embodiments of the present disclosure provide a computer-implemented method, computer system, and computer program product for performing secure payment transactions via the bidirectional communication capabilities of the GNSS. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for performing secure payment transactions comprising:

training, by a global navigation satellite system (GNSS) user device, a foundation model of a generative artificial intelligence-based digital assistant using historic payment transaction training data corresponding to a plurality of different payment service providers;

receiving, by the GNSS user device, using the generative artificial intelligence-based digital assistant, an input from a payer corresponding to the GNSS user device to initiate a payment transaction in a payment message format from the payer to a payee via a GNSS protocol of a GNSS satellite to a payment system server corresponding to a payment service provider;

encrypting, by the GNSS user device, using the generative artificial intelligence-based digital assistant, the payment transaction in the payment message format with a public encryption key provided by the payment service provider based on hardware-based encryption to form an encrypted payment transaction in the payment message format;

transforming, by the GNSS user device, using the generative artificial intelligence-based digital assistant, the encrypted payment transaction in the payment message format to a selected GNSS message format based on the foundation model to form an encrypted payment transaction in the selected GNSS message format;

sending, by the GNSS user device, using the generative artificial intelligence-based digital assistant, the payment transaction in the selected GNSS message format via a secure satellite communication link to the GNSS satellite to be transmitted to the payment system server corresponding to the payment service provider for processing of the payment transaction for the payee to increase security of the payment transaction by avoiding security threats to payment transactions that occur in Internet communications; and retraining, by the GNSS user device, using the generative artificial intelligence-based digital assistant, the foundation model of the generative artificial intelligence-based digital assistant to prioritize the payment transaction utilizing updated training data that include instant payment execution statistics.

2. The method of claim 1, further comprising:

selecting, by the GNSS user device, using the generative artificial intelligence-based digital assistant, a GNSS message format from a set of GNSS message formats to send the payment transaction in the payment message format to the payment system server via the GNSS protocol of the GNSS satellite based on a type of payment corresponding to the payment transaction to form the selected GNSS message format in response to receiving the input to initiate the payment transaction.

3. The method of claim 1, further comprising:

designating, by the GNSS user device, using the generative artificial intelligence-based digital assistant, the payment service provider corresponding to the payment system server in a header of the payment transaction in the payment message format based on at least one of a real time execution success rate of payment transactions and a lowest payment transaction processing charge by the payment service provider.

4. The method of claim 1, further comprising:

receiving, by the GNSS user device, using the generative artificial intelligence-based digital assistant, an encrypted payment status notification in the selected GNSS message format regarding processing of the payment transaction from the payment system server corresponding to the payment service provider via the GNSS satellite; and transforming, by the GNSS user device, using the generative artificial intelligence-based digital assistant, the encrypted payment status notification in the selected GNSS message format to the payment message format to form an encrypted payment status notification in the payment message format.

5. The method of claim 4, further comprising:

decrypting, by the GNSS user device, using the generative artificial intelligence-based digital assistant, the encrypted payment status notification in the payment message format with the public encryption key corresponding to the payment service provider based on hardware-based decryption to form a decrypted payment status notification in the payment message format; and presenting, by the GNSS user device, using the generative artificial intelligence-based digital assistant, the decrypted payment status notification in the payment message format to the payer who initiated the payment transaction via a display of the GNSS user device.

6. A data processing system for performing secure payment transactions comprising:

a processor set;

one or more computer-readable storage media; and program instructions stored on the one or more computer-readable storage media to cause the processor set to perform operations comprising:

training a foundation model of a generative artificial intelligence-based digital assistant using historic payment transaction training data corresponding to a plurality of different payment service providers;

receiving, using the generative artificial intelligence-based digital assistant, an input from a payer corresponding to a global navigation satellite system (GNSS) user device to initiate a payment transaction in a payment message format from the payer to a payee via a GNSS protocol of a GNSS satellite to a payment system server corresponding to a payment service provider;

encrypting, by the GNSS user device, using the generative artificial intelligence-based digital assistant, the payment transaction in the payment message format with a public encryption key provided by the payment service provider based on hardware-based encryption to form an encrypted payment transaction in the payment message format;

transforming, by the GNSS user device, using the generative artificial intelligence-based digital assistant, the encrypted payment transaction in the payment message format to a selected GNSS message format based on the foundation model to form an encrypted payment transaction in the selected GNSS message format;

sending, using the generative artificial intelligence-based digital assistant, the payment transaction in the selected GNSS message format via a secure satellite communication link to the GNSS satellite to be transmitted to the payment system server corresponding to the payment service provider for processing of the payment transaction for the payee to increase security of the payment transaction by avoiding security threats to payment transactions that occur in Internet communications; and retraining, using the generative artificial intelligence-based digital assistant, the foundation model of the generative artificial intelligence-based digital assistant to prioritize the payment transaction utilizing updated training data that include instant payment execution statistics.

7. The data processing system of claim 6, wherein the operations further comprise:

selecting, using the generative artificial intelligence-based digital assistant, a GNSS message format from a set of GNSS message formats to send the payment transaction in the payment message format to the payment system server via the GNSS protocol of the GNSS satellite based on a type of payment corresponding to the payment transaction to form the selected GNSS message format in response to receiving the input to initiate the payment transaction.

8. The data processing system of claim 6, wherein the operations further comprise:

designating, using the generative artificial intelligence-based digital assistant, the payment service provider corresponding to the payment system server in a header of the payment transaction in the payment message format based on at least one of a real time execution success rate of payment transactions and a lowest payment transaction processing charge by the payment service provider.

9. The data processing system of claim 6, wherein the operations further comprise:

receiving, using the generative artificial intelligence-based digital assistant, an encrypted payment status notification in the selected GNSS message format regarding processing of the payment transaction from the payment system server corresponding to the payment service provider via the GNSS satellite;

transforming, using the generative artificial intelligence-based digital assistant, the encrypted payment status notification in the selected GNSS message format to the payment message format to form an encrypted payment status notification in the payment message format;

decrypting, using the generative artificial intelligence-based digital assistant, the encrypted payment status notification in the payment message format with the public encryption key corresponding to the payment service provider based on hardware-based decryption to form a decrypted payment status notification in the payment message format; and presenting, using the generative artificial intelligence-based digital assistant, the decrypted payment status notification in the payment message format to the payer who initiated the payment transaction via a display of the GNSS user device.

10. A computer program product for performing secure payment transactions comprising:

one or more computer-readable storage media of a global navigation satellite system (GNSS) user device; and program instructions stored on the one or more computer-readable storage media to perform operations comprising:

training a foundation model of a generative artificial intelligence-based digital assistant using historic payment transaction training data corresponding to a plurality of different payment service providers;

receiving using the generative artificial intelligence-based digital assistant, an input from a payer corresponding to the GNSS user device to initiate a payment transaction in a payment message format from the payer to a payee via a GNSS protocol of a GNSS satellite to a payment system server corresponding to a payment service provider;

encrypting, using the generative artificial intelligence-based digital assistant, the payment transaction in the payment message format with a public encryption key provided by the payment service provider based on hardware-based encryption to form an encrypted payment transaction in the payment message format;

transforming, using the generative artificial intelligence-based digital assistant, the encrypted payment transaction in the payment message format to a selected GNSS message format based on the foundation model to form an encrypted payment transaction in the selected GNSS message format;

sending, using the generative artificial intelligence-based digital assistant, the payment transaction in the selected GNSS message format via a secure satellite communication link to the GNSS satellite to be transmitted to the payment system server corresponding to the payment service provider for processing of the payment transaction for the payee to increase security of the payment transaction by avoiding security threats to payment transactions that occur in Internet communications; and retraining, using the generative artificial intelligence-based digital assistant, the foundation model of the generative artificial intelligence-based digital assistant to prioritize the payment transaction utilizing updated training data that include instant payment execution statistics.

11. The computer program product of claim 10, wherein the operations further comprise:

selecting, using the generative artificial intelligence-based digital assistant, a GNSS message format from a set of GNSS message formats to send the payment transaction in the payment message format to the payment system server via the GNSS protocol of the GNSS satellite based on a type of payment corresponding to the payment transaction to form the selected GNSS message format in response to receiving the input to initiate the payment transaction.

12. The computer program product of claim 10, wherein the operations further comprise:

designating, using the generative artificial intelligence-based digital assistant, the payment service provider corresponding to the payment system server in a header of the payment transaction in the payment message format based on at least one of a real time execution success rate of payment transactions and a lowest payment transaction processing charge by the payment service provider.

13. The computer program product of claim 10, wherein the operations further comprise:

receiving, using the generative artificial intelligence-based digital assistant, an encrypted payment status notification in the selected GNSS message format regarding processing of the payment transaction from the payment system server corresponding to the payment service provider via the GNSS satellite; and transforming, using the generative artificial intelligence-based digital assistant, the encrypted payment status notification in the selected GNSS message format to the payment message format to form an encrypted payment status notification in the payment message format.

14. The computer program product of claim 13, wherein the operations further comprise:

decrypting, using the generative artificial intelligence-based digital assistant, the encrypted payment status notification in the payment message format with the public encryption key corresponding to the payment service provider based on hardware-based decryption to form a decrypted payment status notification in the payment message format; and presenting, using the generative artificial intelligence-based digital assistant, the decrypted payment status notification in the payment message format to the payer who initiated the payment transaction via a display of the GNSS user device.

* * * * *